United States Patent
Wallace et al.

(10) Patent No.: US 9,600,200 B1
(45) Date of Patent: Mar. 21, 2017

(54) METHOD TO EXTEND SSD LIFESPAN IN CACHING APPLICATIONS BY AGGREGATING RELATED CONTENT INTO LARGE CACHE UNITS

(71) Applicant: EMC Corporation, Hopkinton, MA (US)

(72) Inventors: Grant Wallace, Pennington, NJ (US); Philip Shilane, Yardley, PA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 51 days.

(21) Appl. No.: 14/302,552

(22) Filed: Jun. 12, 2014

(51) Int. Cl.
*G06F 12/08* (2016.01)
*G06F 3/06* (2006.01)
*G06F 12/0813* (2016.01)

(52) U.S. Cl.
CPC ............ *G06F 3/0641* (2013.01); *G06F 3/067* (2013.01); *G06F 3/0619* (2013.01); *G06F 12/0813* (2013.01)

(58) Field of Classification Search
CPC ...... G06F 3/0619; G06F 3/0641; G06F 3/067; G06F 12/0813; G06F 12/0871; G06F 12/0888; G06F 12/126; G06F 2212/222; G06F 2212/468
USPC ......... 707/737; 711/126, 133, 134, 135, 138
See application file for complete search history.

(56) References Cited

U.S. PATENT DOCUMENTS

| 7,089,364 B2 * | 8/2006 | Arimilli | G06F 9/30043 710/54 |
| 2003/0093645 A1 * | 5/2003 | Wong | G06F 12/0864 711/216 |
| 2014/0095775 A1 * | 4/2014 | Talagala | G06F 12/0866 711/103 |

* cited by examiner

*Primary Examiner* — Gary Portka
(74) *Attorney, Agent, or Firm* — Blakely, Sokoloff, Taylor & Zafman LLP

(57) ABSTRACT

Exemplary methods for caching data in a cache device include determining characteristics of a plurality of file extents associated with a plurality of files stored in a random access memory (RAM) device. In one embodiment, the methods include deferring caching of the stored plurality of file extents in a cache device until a predetermined condition has occurred. According to one embodiment, the methods include, in response to determining the predetermined condition has occurred, packing a first portion of the plurality of file extents into a first cache unit based on the characteristics of the file extents, wherein file extents of the first cache unit are likely to be accessed within a predetermined period of time and evicted together from the cache device. The methods further include caching the first cache unit in the cache device and removing the cached file extents from the RAM device.

21 Claims, 5 Drawing Sheets

METHOD TO EXTEND SSD LIFESPAN IN CACHING APPLICATIONS BY AGGREGATING RELATED CONTENT INTO LARGE CACHE UNITS

FIELD

Embodiments of the invention relate to storage systems; and more specifically, to caching data in a cache device.

BACKGROUND

A typical data storage system includes a cache device (herein simply referred to as a cache) that stores data so that future requests for that data can be served faster. The data that is stored within a cache might be values that have been computed earlier or duplicates of original values that are stored elsewhere. If the requested data is contained in the cache (herein referred to as a cache hit), this request can be served by simply reading the cache, which is comparatively faster. On the other hand, if the requested data is not contained in the cache (herein referred to as a cache miss), the data has to be recomputed or fetched from its original storage location, which is comparatively slower. Hence, the greater the number of requests that can be served from the cache, the faster the overall system performance becomes.

Caches can have high churn (i.e., many overwrites) as they try to keep the hottest (i.e., most relevant) data available in a limited storage area. This becomes a problem when the media (e.g., solid state drive (SSD), hard disk drive (HDD), etc.) used for the cache has limited overwrites before the device fails. One conventional approach to address this problem is to pack cached blocks together into larger units that are written to and evicted from the cache as a group. This eliminates small overwrites and reduces overwrites in general. Such a conventional approach, however, can cause fragmentation in the cache and wasted space.

Ideally, blocks of data should be packed together in larger units such that they will all age out at the same time, and the group is evicted together, thus limiting fragmentation. Conventionally, data blocks are packed together based on temporal or stream locality. Packing data blocks using these criteria, however, are problematic. First, blocks which arrive at the same time may contain disparate and unrelated data which do not necessarily expire (in terms of cache utility) at the same time. Second, per-stream packing typically requires that a partially packed group be held in memory for each stream until it can be filled and written to the cache. For example, if there are 500 streams and the packing size is 1 megabyte (MB), the system must allocate 500 MB of memory just for the partially packed, per-stream groups.

BRIEF DESCRIPTION OF THE DRAWINGS

Embodiments of the invention are illustrated by way of example and not limited to the figures of the accompanying drawings in which like references indicate similar elements.

DESCRIPTION OF EMBODIMENTS

Figure 1:
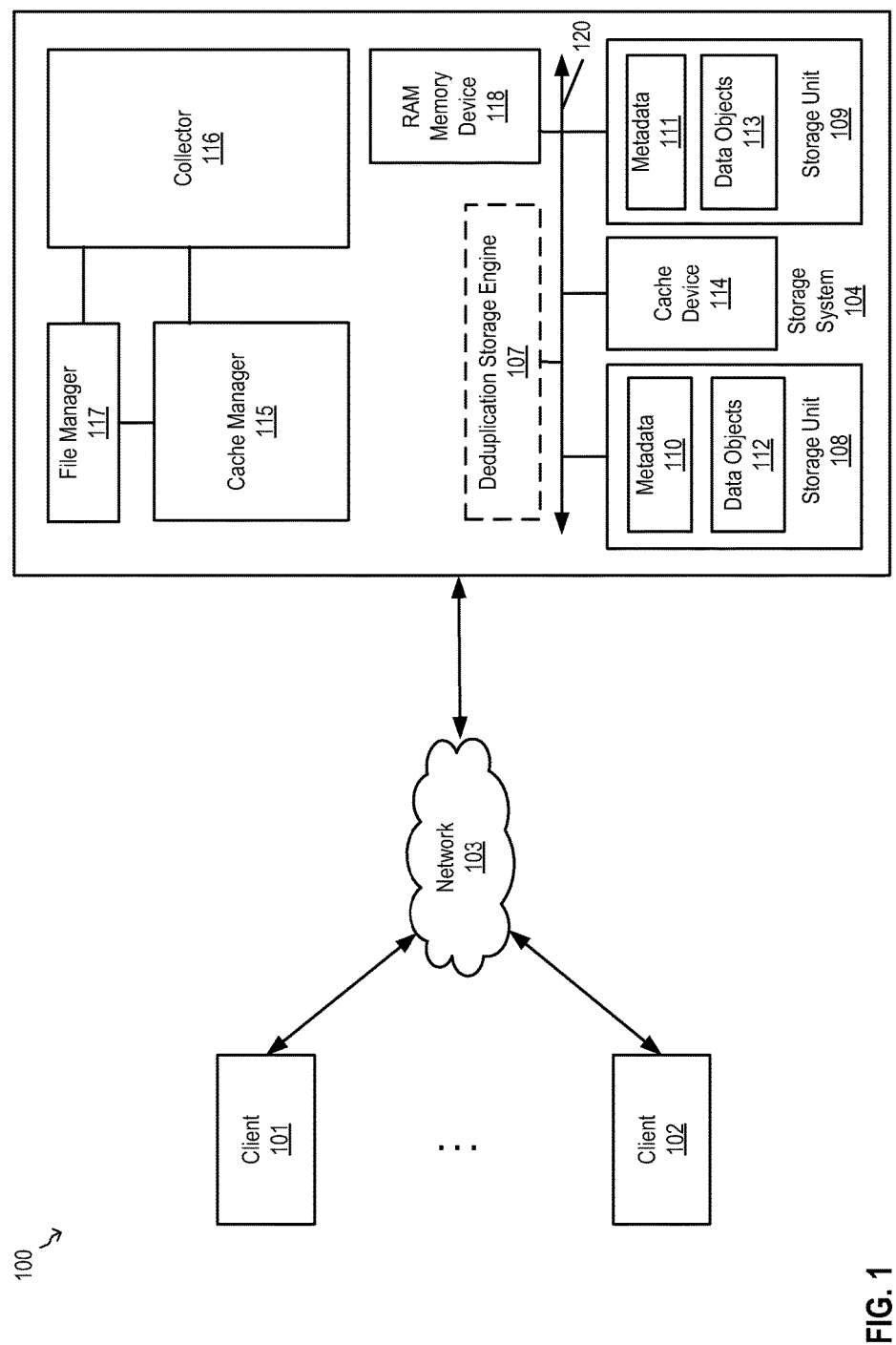
FIG. 1 is a block diagram illustrating a system according to one embodiment.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Techniques for caching file extents stored in a random access memory (RAM) into a cache device are described herein. According to one embodiment, a storage system includes a cache manager configured to receive input/output (I/O) requests (e.g., from a file manager) to access file blocks. As used herein, a "file block" is a data unit of each I/O request to read/write data from/to the storage system. In one embodiment, in response to an I/O write request, the cache manager converts each file block into file extents, and stores/buffers the file extents in a RAM. As used herein, a "file extent" is data unit of each cache access. The cache manager then packs (i.e., groups) the file extents into cache units. As used herein, a "cache unit" is a data unit of cached data that are written to the cache at the same time, and evicted by the cache manager at the same time. According to one embodiment, the cache manager defers the packing of file extents into a cache unit until one or more predetermined conditions have occurred (e.g., the RAM has reached a predetermined usage threshold) even though the number of file extents currently stored in the RAM device is sufficient to pack at least one complete cache unit. In response to the occurrence of one or more predetermined conditions, the cache manager packs the file extents currently stored in the RAM into a cache unit based on collected characteristics of the file extents, such that file extents packed in the same cache unit are likely to be evicted together from the cache device. The cache manager then stores the cache unit in the cache device, and removes the packed file extents from the RAM.

Conventionally, data blocks are packed into cache groups based on the temporal criterion (i.e., data blocks are packed into groups based on when they arrive at the storage system). As described above, such a conventional approach can lead to fragmentation in the cache device because some data blocks within a group may become irrelevant earlier than others, but the irrelevant data blocks cannot be aged out (i.e., evicted from the cache) until all data blocks in the same group have been aged out. Conversely, if the irrelevant data blocks were evicted from the cache, other data blocks in the group which are still relevant would be evicted too early. Here, "irrelevant" data refers to data that are no longer accessed from the storage system. Another conventional approach is to pack data blocks into cache groups based on stream locality. As described above, this can require a lot of memory to be allocated for buffering streams while they fill up into a complete cache group. Further, data blocks that are packed into cache groups based on stream locality may not age out at the same time.

Embodiments of the present invention overcome these limitations by packing file extents into cache units based on more intelligent criteria. In one embodiment, the cache manager packs file extents belonging to the same file into the same cache unit. In another embodiment, the cache manager packs file extents that belong to a predetermined range of neighboring regions of a same file into the same cache unit. Such a packing criterion makes sense, for example, in cases where the number of file extents currently stored in RAM that belong to the same file is high.

In one embodiment, the cache manager packs file extents that have similar access time into the same cache unit. For example, the cache manager may pack file extents that were accessed during the same time period (e.g., at 10:00 am) into the same cache unit. In another embodiment, the cache manager packs file extents that have similar reuse/re-access frequency into the same cache unit. For example, the cache manager may pack file extents that are reused every 5 minutes into the same cache unit, while packing file extents that are reused every 30 minutes into another cache unit. In one embodiment, the cache manager packs file extents that share the same duration of longevity into the same cache unit. For example, the cache manager may pack file extents that have a longevity of 1 hour into one cache unit, while packing file extents that have a longevity of 2 hours into another cache unit.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup/restore engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be a combination of such devices. In the case of disk storage media, the storage units 108-109 may be organized into one or more volumes of Redundant Array of Inexpensive Disks (RAID).

In response to a data file to be stored in storage units 108-109, deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a compression region (CR) of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

In one embodiment, storage system 104 includes one or more network interfaces (not shown) for communicating with other networked devices (e.g., clients 101-102). A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface (s) of a network device, are referred to as IP addresses of that network device; at a more granular level, the IP address(es) assigned to network interface(s) assigned to a node implemented on a network device, can be referred to as IP addresses of that node.

In one embodiment, storage system 104 includes file manager 117, which can be executed by a processor to provide an interface to access files stored at storage system 104. File manager 117 may be part of a file system service interface. In one embodiment, file manager 117 interfaces with cache manager 115 to access (e.g., read/write) data from/to storage. For example, in response to a request from file manager 117 to read data from storage, cache manager 115 determines whether the requested data is currently stored in one or more cache entries (not shown) of cache device 114. In response to determining the requested data is currently stored in cache device 114 (herein referred to as a cache hit), the requested data is fetched from cache device 114 and stored in RAM 118. File manager 117 then reads the requested data from RAM 118 and presents the requested data to the requesting client (e.g., clients 101-102).

In response to determining the requested data is not cached in cache device 114 (herein referred to as a cache miss), cache manager 115 fetches the requested data from storage (e.g., storage units 108-109) or causes storage system 104 to re-compute the requested data, and stores the requested data in RAM 118 to be presented to the client by file manager 117. Further, cache manager 115 caches the requested data in cache device 114 in order to provide faster access to the requested data in the near future. By way of further example, in response to a request from file manager 117 to write data to storage, cache manager 115 caches the write data in cache device 114 in order to provide faster access to the write data in the near future.

In some instances, when data is to be populated in cache device 114, cache manager 115 may have to evict one or more cache entries in order to make room for the new data. As used herein, "evicting" a cache entry refers to the reusing of the cache entry to store new data. In other words, evicting a cache entry involves overwriting the cache entry with new data. Most cache devices can only handle a limited number of overwrites before they no longer function. In order to extend the life of cache device 114, storage system 104 minimizes the number of small overwrites performed on cache device 114 by packing the new data into cache units (which are written and later evicted/overwritten together as a group), and storing the cache units in cache device 114. Each cache unit may be stored as part of one or more cache entries. Note also that it is generally faster to write large blocks of data to a storage device rather than writing many small blocks at different offsets.

Conventionally, data are packed into larger cache groups based on temporal or stream locality which can result in fragmentation of the cache device and/or waste of memory. Storage system 104 overcomes these limitations by including collector 116 configured to collect characteristics of the file extents stored in RAM 118. In one embodiment, cache manager 115 is to select a criterion for packing the file extents into cache units, wherein the packing criterion is selected such that file extents packed into the same cache unit are likely to be aged out together from cache device 114. Cache manager 115 then identifies file extents stored in RAM 118 that have characteristics satisfying the selected criterion, packs the identified file extents into one or more cache units, and stores them in cache device 114. Throughout the description, data caching is described in specific contexts (e.g., data access from/to storage). One having ordinary skill in the art would recognize that the techniques described herein for intelligently packing data into cache units are equally applicable to any application that require data to be cached, and not limited to data access from/to storage. Embodiments for packing file extents shall now be described in greater details through the description of various other figures below, in which like references indicate similar elements.

Figure 2:
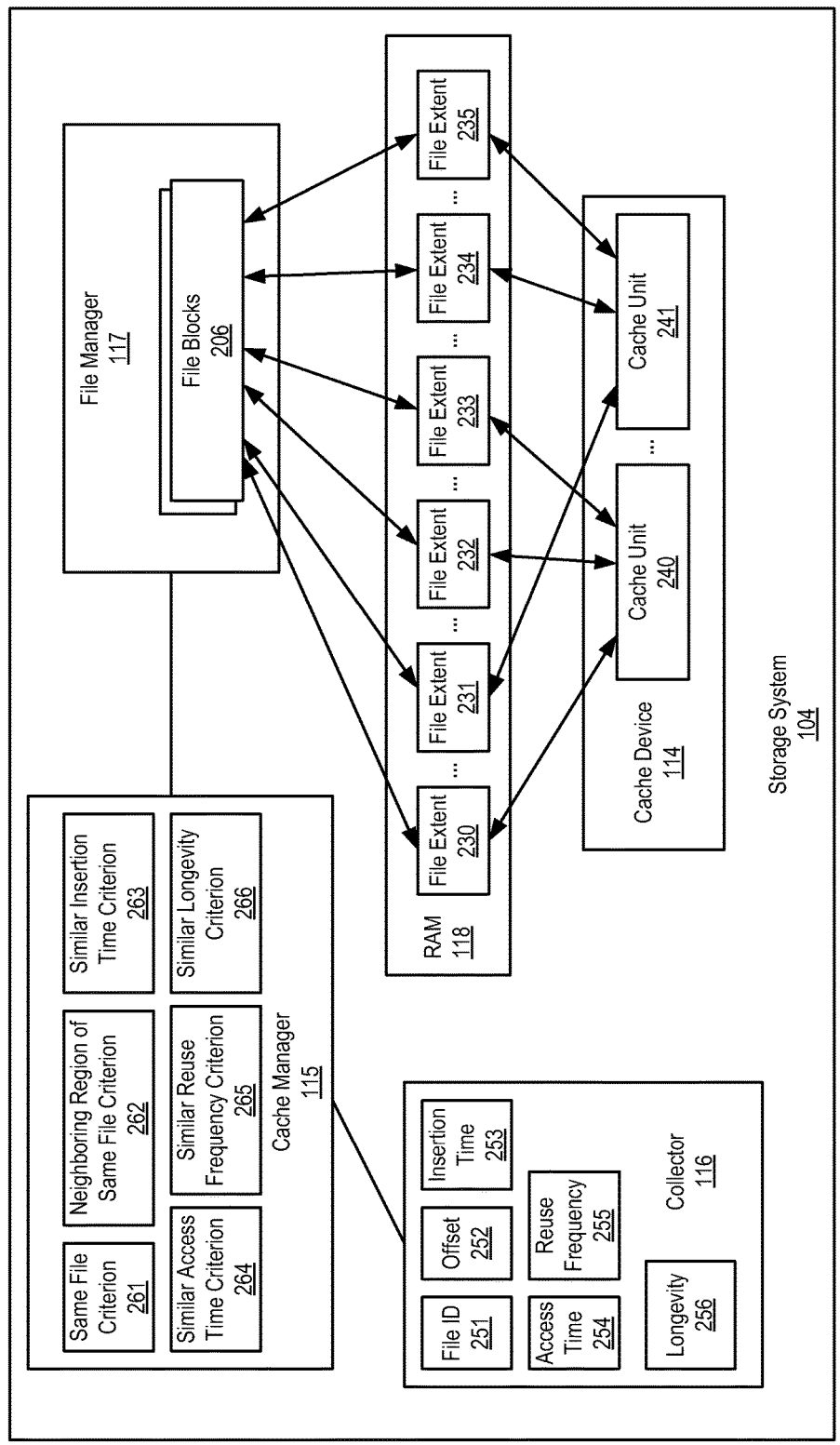
FIG. 2 is a block diagram illustrating a system according to one embodiment.

FIG. 2 is a block diagram illustrating a storage system according to one embodiment. The storage system illustrated in FIG. 2 is similar to the storage system in FIG. 1. Certain details have been omitted, however, in order to avoid obscuring the invention. Further, certain other details of storage system 104 have been added in FIG. 2 in order to better illustrate the invention.

According to one embodiment, file manager 117 receives file blocks 206 (e.g., from clients 101-102) to be stored at storage system 104. File manager 117 partitions file blocks 206 into file extents 230-235 and stores them in RAM 118. It is to be appreciated that the number of file extents shown is for illustrative purposes, not limitation. Cache manager 115 is to cache file extents 230-235 in cache device 114 so that they can be accessed quickly in the near future. In one embodiment, cache manager 115 defers the caching of file extents 230-235 in cache device 114 until one or more predetermined conditions has occurred. In one embodiment, the predetermined conditions include RAM 118 reaching a predetermined usage threshold. In another embodiment, the predetermined conditions include the number of file extents stored in RAM 118 reaching a predetermined file extent threshold, which can be defined by the size of cache units 240-241. For example, the predetermined file extent threshold can be set to a value such that when there is a sufficient number of file extents stored in RAM 118 to pack at least some predetermined number of cache units, cache manager 115 will be alerted to pack the file extents.

In one embodiment, in response to determining one or more predetermined conditions has occurred, cache manager 115 determines a packing criterion, for example, by selecting one of packing criteria 261-266. Here, cache manager 115 selects a packing criterion such that file extents packed into the same cache unit are likely to require eviction at the same time. Cache manager 115 then processes the characteristics associated with file extents 230-235, such as, for example, characteristics 251-256, to identify the file extents that have characteristics satisfying the selected criterion. Cache manager 115 then packs the identified file extents into one or more of cache units 240-241, and store them in cache device 114. In the illustrated example, cache manager 115 packs file extents 230, 232, and 233 into cache unit 240, and file extents 231, 234, and 235 into cache unit 241.

Storage system 104 includes collector 116 for collecting characteristics of file extents 230-235. The collected characteristics, for example, can be stored as part of RAM 118, or any other memory that is coupled to storage system 104. According to one embodiment, collector 116 collects characteristics 251-256, including file identifier (ID) 251, offset 252, insertion time 253, access time 254, reuse frequency 255, longevity 256, or any combination thereof. Characteristics 251-256, for example, can be collected for each of file extents 230-235.

File ID 251 identifies the file that the respective file extent belongs to. Thus, for example, file extents with file IDs 251 that contain the same ID belong to the same file. Offset 252 identifies the location within a file that the respective file extent is located. For example, offset 252 can be a value representing an offset from the beginning of a file, thus indicating the location in the file of the respective file extent. File ID 251 and offset 252 can be generated by, for example, file manager 117, and/or provided by the client accessing the file.

Insertion time 253, in one embodiment, represents the time of day when the respective file extent was inserted into storage system 104 (e.g., in RAM 118 of storage system 104), for example, during a write request. In one embodiment, access time 254 represents the time of day when the respective file extent was accessed from storage system 104 (e.g., from RAM 118 of storage system 104), for example, during a read request. Access time 254 can include multiple values, each representing a different time of access. Insertion time 253 and access time 254, for example, can be generated by file manager 117.

According to one embodiment, reuse frequency 255 contains information indicating how often the respective file extent was accessed during a predetermined time window. For example, reuse frequency 255 may include information indicating the respective file extent has been accessed by file manager 117 every 5 minutes within the last 1 hour. In such an embodiment, collector 116 is to maintain a log of timestamps of when file extents 230-235 are accessed. Collector 116 can then mine the log to determine a time interval between consecutive accesses of each file extent. Collector 116 may determine an average of the time intervals within the predetermined time window for each file extent to determine its reuse frequency.

In one embodiment, longevity 256 contains information indicating how long the respective file extent remains active in cache device 114. Here, an "active" file extent refers to a file extent that is actively accessed during a time window. For example, longevity 256 may represent a duration of time (e.g., 2 hours) of when the respective file extent was actively accessed by file manager 117. In such an embodiment, collector 116 is to maintain a log of timestamps of when file extents 230-235 are accessed by file manager 117. Collector 116 can then mine the log to determine the longevity of file extents 230-235. In one embodiment, the longevity of a file extent can be defined by the time interval between the oldest access time and the most recent access time. By way of example, assume that the log contains information indicating that file extent 230 was accessed at 8:00 am, 8:05 am, and 9:00 am. In such an example, the longevity of file extent 230 would be 1 hour (i.e., from 8:00 am to 9:00 am). According to one embodiment, longevity 256 can be included as part of the cache unit. In this way, cache manger 115 may use longevity 256 as a hint as to whether it is acceptable to evict the cache unit.

According to one embodiment, cache manager 115 can pack file extents based on various packing criteria, including for example, packing criteria 261-265. Packing criteria 261-265 have been included as part of cache manager 115 in order to overcome the limitations of the conventional simplistic approach to packing data based on temporal or stream locality. In one embodiment, in response to selecting same file criterion 261, cache manager 115 packs file extents that belong to the same file into the same cache unit. Heuristically, data from the same file is likely to be re-accessed or likely not to be re-accessed together, and thus, it makes sense to pack them into the same cache unit so that they can all be evicted together, thus avoiding cache fragmentation. In such an embodiment, cache manager 115 processes file IDs 251 of the file extents currently stored in RAM 118 to identify file extents that belong to the same file. For example, when file IDs 251 of the file extents contain the same ID, cache manager 115 determines that they belong to the same file. By way of example, assume that file IDs 251 of file extents 230, 232, and 233 indicate that they belong to a first same file, and file IDs 251 of file extents 231, 234, and 235 indicate that they belong to a second same file. In such a scenario, cache manager 115 may pack file extents 230, 232, and 233 into cache unit 240 because they belong to the first same file. Cache manager 115 may pack file extents 231, 234, and 235 into cache unit 241 because they belong to the second same file.

In one embodiment, in response to selecting neighboring region of same file criterion 262, cache manager 115 packs file extents that belong to the same file and located within the same region of the file into the same cache unit. Heuristically, data from the same region of the same file is likely to be re-accessed or likely not to be re-accessed together, and thus, it makes sense to pack them into the same cache unit so that they can all be evicted together, thus avoiding cache fragmentation. The region of a file can be defined by a predetermined size (e.g., in bytes). In such an embodiment, cache manager 115 processes file IDs 251 of the file extents currently stored in RAM 118 to identify file extents that belong to the same file. Cache manager 115 then processes offsets 252 of the identified file extents to identify file extents that are located within the same region. By way of example, assume that file IDs 251 of file extents 230-235 indicate that they all belong to the same file. Assume further that offsets 252 of file extents 230, 232, and 233 indicate that they are neighboring file extents within the file (i.e., located in the same region), and that offsets 252 of file extents 231, 234, and 235 indicate that they are neighboring file extents within the file (i.e., located in the same region). In such a scenario, cache manager 115 may pack file extents 230, 232, and 233 into cache unit 240 because they all belong to a first same region of the file. Cache manager 115 may pack file extents 231, 234, and 235 into cache unit 241 because they belong to a second same region of the file.

In one embodiment, in response to selecting similar insertion time criterion 263, cache manager 115 packs file extents that are inserted into storage system 104 (e.g., RAM 118 of storage system 104) within the same time period into the same cache units. Heuristically, data inserted into storage system 104 during a same time window are likely to become irrelevant at the same time, and thus, it makes sense to pack them into the same cache unit so that they can all be evicted together, thus avoiding cache fragmentation. The time period can be a predetermined duration of time. In such an embodiment, cache manager 115 processes insertion times 253 of the file extents currently stored in RAM 118 to identify file extents that were inserted into storage system 104 during the same time window. By way of example, assume that insertion times 253 of file extents 230, 232, and 233 indicate that they were inserted into storage system 104 at time 8:01 am, 8:05 am, and 8:50 am, respectively, and that insertion times 253 of file extents 231, 234, and 235 indicate that they were inserted into storage system 104 at time 10:01 am, 10:05 am, and 10:50 am, respectively. Assume further that the predetermined time window is 1 hour. In such a scenario, cache manager 115 may pack file extents 230, 232, and 233 into cache unit 240 because they were all inserted within the same hour window. Cache manager 115 may pack file extents 231, 234, and 235 into cache unit 241 because they were all inserted within the same hour window. A smaller time window can be used in order to further improve the accuracy of cache eviction predictions. More processing resources and memory, however, will be required.

In one embodiment, in response to selecting similar access time criterion 264, cache manager 115 packs file extents that were accessed from storage system 104 (e.g., RAM 118 of storage system 104) within the same time period into the same cache units. Heuristically, data accessed from storage system 104 during a same time window are likely to be re-accessed at the same time, or likely not to be re-accessed at the same time, and thus, it makes sense to pack them into the same cache unit so that they can all be evicted together, thus avoiding cache fragmentation. The time period can be a predetermined duration of time. In such an embodiment, cache manager 115 processes access times 254 of the file extents currently stored in RAM 118 to identify file extents that were accessed from storage system 104 during the same time window. By way of example, assume that access times 254 of file extents 230, 232, and 233 indicate that they were accessed from storage system 104 at time 8:01 am, 8:05 am, and 8:50 am, respectively, and that access times 254 of file extents 231, 234, and 235 indicate that they were accessed from storage system 104 at time 10:01 am, 10:05 am, and 10:50 am, respectively. Assume further that the predetermined time window is 1 hour. In such a scenario, cache manager 115 may pack file extents 230, 232, and 233 into cache unit 240 because they were all accessed within the same hour window. Cache manager 115 may pack file extents 231, 234, and 235 into cache unit 241 because they were all accessed within the same hour window. A smaller time window can be used in order to further improve the accuracy of cache eviction predictions. More processing resources and memory, however, will be required.

In one embodiment, in response to selecting similar reuse frequency criterion 265, cache manager 115 packs file extents that were re-accessed from storage system 104 (e.g., RAM 118 of storage system 104) within the same frequency range into the same cache units. Heuristically, data re-accessed from storage system 104 with similar frequency are likely to be re-accessed at the same time, or likely not to be re-accessed at the same time, and thus, it makes sense to pack them into the same cache unit so that they can all be evicted together, thus avoiding cache fragmentation. The frequency range can be a predetermined range (e.g., every 5 minutes, every 10 minutes, etc.). In such an embodiment, cache manager 115 processes reuse frequencies 255 of the file extents currently stored in RAM 118 to identify file extents that were re-accessed from storage system 104 with similar frequency.

By way of example, assume that reuse frequencies 255 of file extents 230, 232, and 233 indicate that they were re-accessed from storage system 104 every 5 minutes, 6 minutes, and 8 minutes, respectively, and that reuse frequencies 255 of file extents 231, 234, and 235 indicate that they were re-accessed from storage system 104 every 30 minutes, 35 minutes, and 38 minutes, respectively. Assume further that cache manager 115 has been configured with a frequency range of 10 minutes, meaning that extents that are initially reused within 10 minutes of each other may be packed together. In such a scenario, cache manager 115 may pack file extents 230, 232, and 233 into cache unit 240 because they were all re-accessed within the frequency range of 10 minutes. Cache manager 115 may pack file extents 231, 234, and 235 into cache unit 241 because they were all re-accessed within the frequency range of 10 minutes. It shall be understood that file extents that are re-accessed at a frequency that is beyond the predetermined frequency range can be packed into the same cache unit. Smaller frequency ranges can be used to further improve the accuracy of cache eviction predictions. More processing resources and memory, however, will be required.

In one embodiment, in response to selecting similar longevity criterion 266, cache manager 115 packs file extents that remained active in cache device 114 for the same longevity range into the same cache units. Heuristically, data which historically remained active for similar durations of time are likely to remain active for similar durations of time in the near future, and thus, it makes sense to pack them into the same cache unit so that they can all be evicted together, thus avoiding cache fragmentation. The longevity range can be a predetermined duration of time (e.g., 10 minutes). In such an embodiment, cache manager 115 processes longevities 256 of the file extents currently stored in RAM 118 to identify file extents that historically had similar longevity.

By way of example, assume that longevities 256 of file extents 230, 232, and 233 indicate that they remained active in cache device 114 for 5 minutes, 6 minutes, and 8 minutes, respectively, and that longevities 256 of file extents 231, 234, and 235 indicate that they remained active in cache device 114 for 30 minutes, 35 minutes, and 38 minutes, respectively. Assume further that cache manager 115 has been configured with a longevity range of 10 minutes, meaning that extents that become inactive within 10 minutes of each other may be packed together. In such a scenario, cache manager 115 may pack file extents 230, 232, and 233 into cache unit 240 because they all have longevity within the longevity range of 10 minutes. Cache manager 115 may pack file extents 231, 234, and 235 into cache unit 241 because they all have longevity within the longevity of range of 10 minutes. It shall be understood that file extents that have longevities beyond the predetermined longevity range can be packed into the same cache unit.

In one embodiment, longevities 256 can be included as part of cache units 240 and 241 in order to serve as hints as to whether cache units 240 and 241 can be evicted. For example, cache manager 115 can use the longest longevity included as part of the cache unit to determine whether the cache unit can be evicted. In the above example, cache manager 115 may decide that cache unit 240 cannot be evicted until at least 8 minutes have elapsed from when cache unit 240 was stored in cache device 114 because historically file extent 233 remained active for 8 minutes. In a more aggressive eviction algorithm, cache manager 115 can use the shortest longevity to determine whether the cache unit can be evicted. In such an embodiment, referring still to the above example, cache manager 115 may decide that cache unit 240 cannot be evicted until at least 5 minutes have elapsed from when cache unit 240 was stored in cache device 114 because historically file extent 230 remained active for 5 minutes.

According to one embodiment, cache manager 115 uses different packing criteria to pack the cache units (e.g., cache manager 115 may use one packing criterion to pack cache unit 240, and another packing criterion to pack cache unit 241). In one such embodiment, in response to determining the number of file extents stored in RAM 118 belonging to the same file exceeds a predetermined same file threshold, cache manager 115 may select neighboring region of same file criterion 262 to pack the file extents. Here, the rationale is that if too many file extents in RAM 118 belong to the same file, cache eviction predictions can further be improved by packing file extents that belong to the same region in the file. It shall be understood, however, that neighboring region of same file criterion 262 does not work well if the file extents stored in RAM 118 are not located in the same regions, but rather spread throughout the file.

According to one embodiment, cache manger 115 selects a packing criterion based on the current performance of cache 114. For example, cache manager 115 may start with one or more packing criteria, and after some predetermined period of time, determine the fragmentation level of cache unit 114. In one embodiment, in response to determining the current fragmentation level of cache unit 114 exceeds a predetermined threshold, cache manger 115 selects one or more packing criteria that are different from the previously selected packing criteria.

Figure 3:
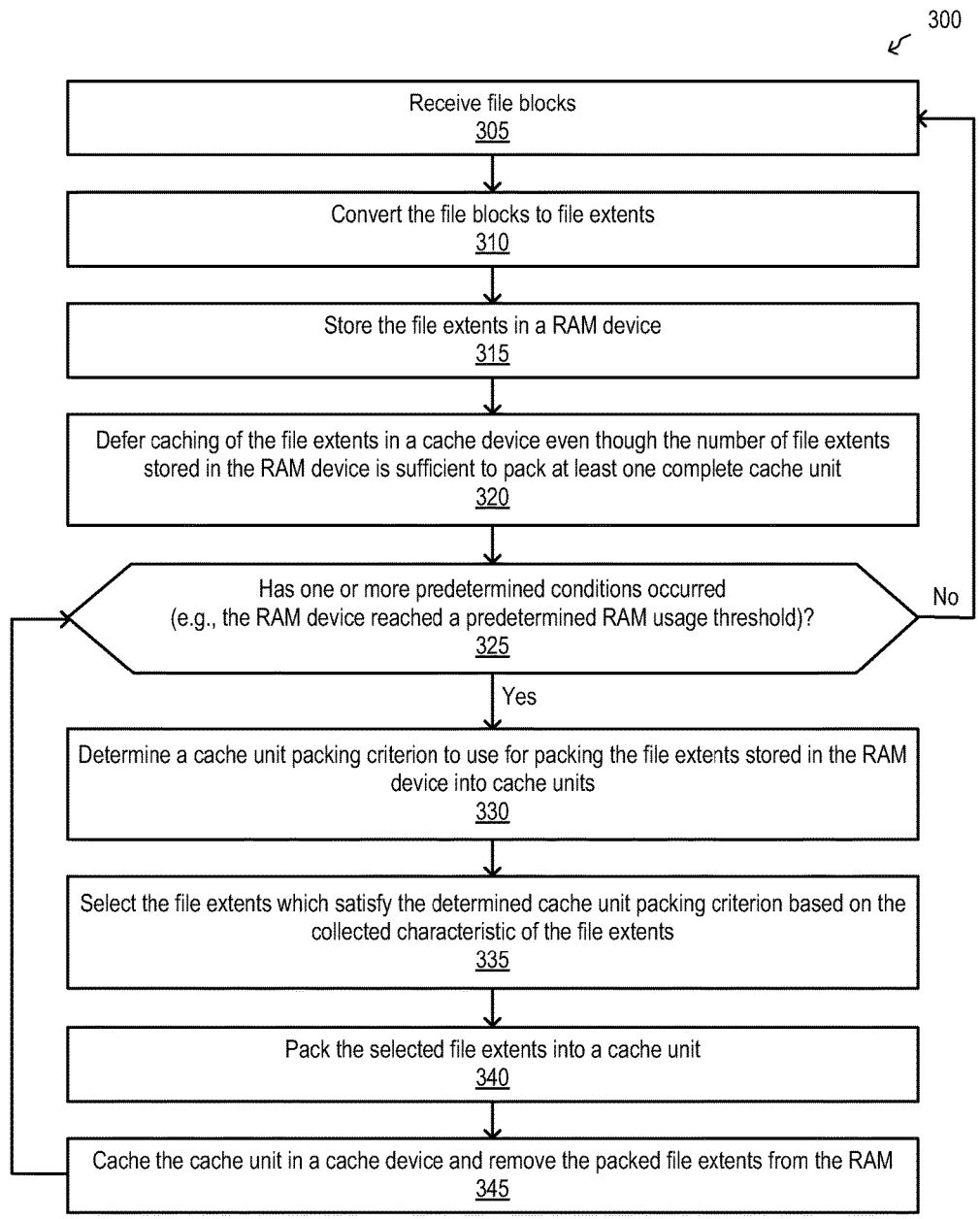
FIG. 3 is a flow diagram illustrating a method for cache data according to one embodiment.

FIG. 3 is a flow diagram illustrating method 300 for caching data according to one embodiment. For example, method 300 can be performed by storage system 104, which can be implemented in software, firmware, hardware, or any combination thereof. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

Referring now to FIG. 3. At block 305, the storage system receives file blocks. For example, file manager 117 receives file blocks 206. At block 310, the storage system converts the file blocks to file extents. For example, file manager 117 converts file blocks 206 to file extents 230-235. At block 315, the storage system stores the file extents in a RAM device. For example, file manager 117 stores file extents 230-235 in RAM 118.

At block 320, the storage system defers caching of the file extents in a cache device even though the number of file extents stored in the RAM device is sufficient to pack at least one complete cache unit. For example, cache manager 115 defers caching of file extents 230-235 in cache device 114 even though there are sufficient file extents to pack at least one complete cache unit.

At block 325, the storage system determines whether one or more predetermined conditions have occurred. For example, cache manager 115 determines whether RAM 118 has reached a predetermined RAM usage threshold. In response to determining none of the predetermined conditions have occurred, the storage system returns back to block 305 to receive more file blocks.

At block 330, in response to determining one or more predetermined conditions have occurred, the storage system determines a cache unit packing criterion to use for packing the file extents stored in the RAM device into cache units. For example, cache manager 115 selects a packing criterion from one of packing criteria 261-266.

At block 335, the storage system selects the file extents which satisfy the determined cache unit packing criterion based on the collected characteristic of the file extents. For example, cache manager 115 processes collected characteristics 251-256 of file extents 230-235 to identify and select file extents that satisfy the determined packing criterion. At block 340, the storage system packs the selected file extents into a cache unit. For example, cache manager 115 packs file extents 230, 232, and 233 into cache unit 240, and file extents 231, 234, and 235 into cache unit 241. At block 345, the storage system caches the cache units in a cache device, and removes the packed file extents from the RAM. For example, cache manager 115 stores cache units 240 and 241 in cache device 114, and removes file extents 230-235 from RAM 118.

Figure 4:
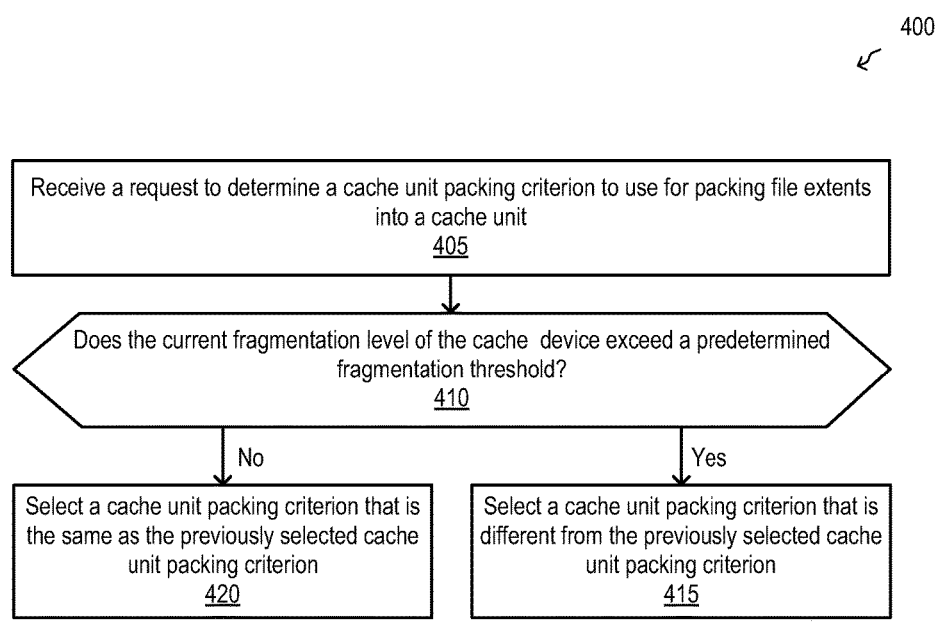
FIG. 4 is a flow diagram illustrating a method for cache data according to one embodiment.

FIG. 4 is a flow diagram illustrating method 400 for caching data according to one embodiment. For example, method 400 can be performed by storage system 104 (e.g., cache manager 115 of storage system 104), which can be implemented in software, firmware, hardware, or any combination thereof. Referring now to FIG. 4. At block 405, the cache manager receives a request to determine a cache unit packing criterion to use for packing file extents into a cache unit. At block 410, the cache manager determines whether the current fragmentation level of a cache device (e.g., cache device 114) exceeds a predetermined fragmentation threshold.

At block 415, in response to determining the fragmentation level of the cache device exceeds the threshold, the cache manager selects a cache unit packing criterion that is different from the previously selected cache unit packing criterion. In this way, the cache manager can attempt to improve the cache performance by packing data differently from how it has been packed in the past. At block 420, in response to determining the fragmentation level of the cache device does not exceed the threshold, the cache manager selects a cache unit packing criterion that is the same as the previously selected cache unit packing criterion. In this way, the cache manager can continue to pack data as it has been in the past, knowing such packing criteria have yielded good cache performance.

Figure 5:
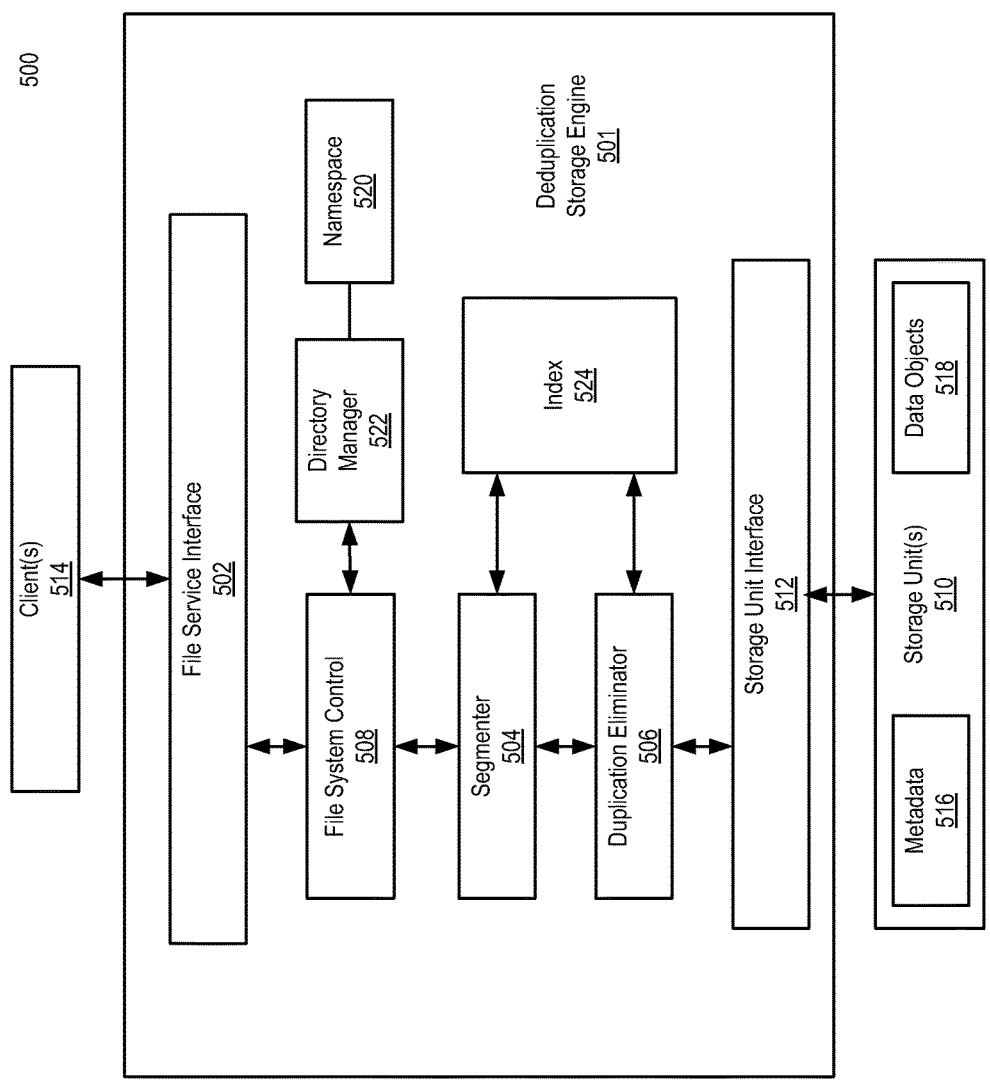
FIG. 5 is a block diagram illustrating a deduplication storage engine which can be used with embodiments of the invention.

FIG. 5 is a block diagram illustrating a deduplication storage system according to one embodiment of the invention. For example, deduplication storage system 500 may be implemented as part of a deduplication storage system as described above, such as, for example, the deduplication storage system as shown in FIG. 1. In one embodiment, storage system 500 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 500 may have a distributed architecture, or all of its components may be integrated into a single unit. Storage system 500 may be implemented as part of an archive and/or backup system such as a deduplicating storage system available from EMC® Corporation of Hopkinton, Mass.

In one embodiment, storage system 500 includes a deduplication engine 501 interfacing one or more clients 514 with one or more storage units 510 storing metadata 516 and data objects 518. Clients 514 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 510 may be implemented locally (e.g., single node operating environment) or remotely (e.g., multi-node operating environment) via an interconnect, which may be a bus and/or a network. In one embodiment, one of storage units 510 operates as an active storage to receive and store external or fresh user data, while the another one of storage units 510 operates as a target storage unit to periodically archive data from the active storage unit according to an archiving policy or scheme. Storage units 510 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 510 may also be combinations of such devices. In the case of disk storage media, the storage units 510 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 516, may be stored in at least some of storage units 510, such that files can be accessed independent of another storage unit. Metadata of each storage unit includes enough information to provide access to the files it contains. In one embodiment, metadata may include fingerprints contained within data objects 518, where a data object may represent a data segment, a compression region (CR) of data segments, or a container of one or more CRs. Fingerprints are mapped to a particular data object via metadata 516, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication storage engine 501 includes file service interface 502, segmenter 504, duplicate eliminator 506, file system control 508, and storage unit interface 512. Deduplication storage engine 501 receives a file or files (or data item(s)) via file service interface 502, which may be part of a file system namespace 520 of a file system associated with the deduplication storage engine 501. The file system namespace 520 refers to the way files are identified and organized in the system. An example is to organize the files hierarchically into directories or folders, which may be managed by directory manager 522. File service interface 502 supports a variety of protocols, including a network file system (NFS), a common Internet file system (CIFS), and a virtual tape library interface (VTL), etc.

The file(s) is/are processed by segmenter 504 and file system control 508. Segmenter 504, also referred to as a content store, breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 508, also referred to as a file system manager, processes information to indicate the segment(s) association with a file. In some embodiments, a list of fingerprints is used to indicate segment(s) associated with a file. File system control 508 passes segment association information (e.g., representative data such as a fingerprint) to index 524. Index 524 is used to locate stored segments in storage units 510 via storage unit interface 512. Duplicate eliminator 506, also referred to as a segment store, identifies whether a newly received segment has already been stored in storage units 510. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 510 that make up the file. Segments are then packed by a container manager (which may be implemented as part of storage unit interface 512) into one or more storage containers stored in storage units 510. The deduplicated segments may be further compressed into one or more CRs using a variation of compression algorithms, such as a Lempel-Ziv algorithm before being stored. A container may contains one or more CRs and each CR may contain one or more deduplicated segments. A container may further contain the metadata such as fingerprints, type of the data segments, etc. that are associated with the data segments stored therein.

When a file is to be retrieved, file service interface 502 is configured to communicate with file system control 508 to identify appropriate segments stored in storage units 510 via storage unit interface 512. Storage unit interface 512 may be implemented as part of a container manager. File system control 508 communicates (e.g., via segmenter 504) with index 524 to locate appropriate segments stored in storage units via storage unit interface 512. Appropriate segments are retrieved from the associated containers via the container manager and are used to construct the requested file. The file is provided via interface 502 in response to the request. In one embodiment, file system control 508 utilizes a tree (e.g., a segment tree obtained from namespace 520) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 501 may be implemented in software, hardware, or a combination thereof. For example, deduplication engine 501 may be implemented in a form of executable instructions that can be stored in a machine-readable storage medium, where the instructions can be executed in a memory by a processor.

In one embodiment, storage system 500 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

An electronic device or a computing device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A computer-implemented method for caching data in a cache device, the method comprising:
   determining, by a cache manager executed by a processor, characteristics of a plurality of file extents associated with a plurality of files stored in a random access memory (RAM) device, wherein the plurality of files are stored in one or more persistent storage units, and wherein each file extent is a data unit of each cache access;
   deferring caching of the stored plurality of file extents in a cache device until a predetermined condition has occurred;
   in response to determining the predetermined condition has occurred, packing a first portion of the plurality of file extents into a first cache unit based on the characteristics of the file extents, wherein file extents of the first cache unit are to be accessed within a predetermined period of time and evicted together from the cache device;
   caching the first cache unit in the cache device; and
   removing the cached file extents from the RAM device.

2. The method of claim 1, wherein caching of the stored plurality of file extents in the cache device is deferred even though a number of file extents currently stored in the RAM device is sufficient to pack at least one complete cache unit.

3. The method of claim 1, wherein the predetermined condition is the RAM device reaching a predetermined RAM usage threshold.

4. The method of claim 1, wherein packing a first portion of the plurality of file extents into a first cache unit comprises:
   identifying the first portion of file extents belonging to a predetermined range of neighboring regions of a same file to be packed into a same cache unit; and
   packing the identified file extents into the first cache unit.

5. The method of claim 1, further comprising:
   determining based on historical access information that two or more file extents are frequently aged out of a cache at approximately a same time;
   packing the determined two or more file extents stored in the RAM device into a second cache unit; and
   caching the second cache unit in the cache device.

6. The method of claim 1, wherein each file extent includes information identifying a file associated with the file extent, a region within the file at which the file extent is located, and a timestamp of when the file extent was stored in the RAM device.

7. The method of claim 1, wherein the determined plurality of characteristics includes information identifying a timestamp when a file extent was accessed from the RAM device, information identifying whether a file extent was sequentially or randomly accessed, and information identifying a frequency of access of a file extent from the RAM device.

8. A non-transitory computer-readable storage medium having computer instructions stored therein, which when executed by a processor, cause the processor to perform operations comprising:
   determining characteristics of a plurality of file extents associated with a plurality of files stored in a random access memory (RAM) device, wherein the plurality of files are stored in one or more persistent storage units, and wherein each file extent is a data unit of each cache access;
   deferring caching of the stored plurality of file extents in a cache device until a predetermined condition has occurred;
   in response to determining the predetermined condition has occurred, packing a first portion of the plurality of file extents into a first cache unit based on the characteristics of the file extents, wherein file extents of the first cache unit are to be accessed within a predetermined period of time and evicted together from the cache device;
   caching the first cache unit in the cache device; and
   removing the cached file extents from the RAM device.

9. The non-transitory computer-readable storage medium of claim 8, wherein caching of the stored plurality of file extents in the cache device is deferred even though a number of file extents currently stored in the RAM device is sufficient to pack at least one complete cache unit.

10. The non-transitory computer-readable storage medium of claim 8, wherein the predetermined condition is the RAM device reaching a predetermined RAM usage threshold.

11. The non-transitory computer-readable storage medium of claim 8, wherein packing a first portion of the plurality of file extents into a first cache unit comprises:
   identifying the first portion of file extents belonging to a predetermined range of neighboring regions of a same file to be packed into a same cache unit; and
   packing the identified file extents into the first cache unit.

12. The non-transitory computer-readable storage medium of claim 8, further comprising:
  determining based on historical access information that two or more file extents are frequently aged out of a cache at approximately a same time;
  packing the determined two or more file extents stored in the RAM device into a second cache unit; and
  caching the second cache unit in the cache device.

13. The non-transitory computer-readable storage medium of claim 8, wherein each file extent includes information identifying a file associated with the file extent, a region within the file at which the file extent is located, and a timestamp of when the file extent was stored in the RAM device.

14. The non-transitory computer-readable storage medium of claim 8, wherein the determined plurality of characteristics includes information identifying a timestamp when a file extent was accessed from the RAM device, information identifying whether a file extent was sequentially or randomly accessed, and information identifying a frequency of access of a file extent from the RAM device.

15. A data processing system, comprising:
  a set of one or more processors;
  one or more persistent storage units;
  a cache device; and
  a set of one or more memories to store instructions, which when executed from the set of one or more memories, cause the data processing system to
    determine characteristics of a plurality of file extents associated with a plurality of files stored in a random access memory (RAM) device, wherein the plurality of files are stored in the one or more persistent storage units, and wherein each file extent is a data unit of each cache access,
    defer caching of the stored plurality of file extents in the cache device until a predetermined condition has occurred,
    in response to determining the predetermined condition has occurred, pack a first portion of the plurality of file extents into a first cache unit based on the characteristics of the file extents, wherein file extents of the first cache unit are to be accessed within a predetermined period of time and evicted together from the cache device,
    cache the first cache unit in the cache device, and
    remove the cached file extents from the RAM device.

16. The data processing system of claim 15, wherein caching of the stored plurality of file extents in the cache device is deferred even though a number of file extents currently stored in the RAM device is sufficient to pack at least one complete cache unit.

17. The data processing system of claim 15, wherein the predetermined condition is the RAM device reaching a predetermined RAM usage threshold.

18. The data processing system of claim 15, wherein the set of one or more memories further store instructions, which when executed from the set of one or more memories, cause the data processing system to:
  identify the first portion of file extents belonging to a predetermined range of neighboring regions of a same file to be packed into a same cache unit, and
  pack the identified file extents into the first cache unit.

19. The data processing system of claim 15, wherein the set of one or more memories further store instructions, which when executed from the set of one or more memories, cause the data processing system to:
  determine based on historical access information that two or more file extents are frequently aged out of a cache at approximately a same time;
  pack the determined two or more file extents stored in the RAM device into a second cache unit; and
  cache the second cache unit in the cache device.

20. The data processing system of claim 15, wherein each file extent includes information identifying a file associated with the file extent, a region within the file at which the file extent is located, and a timestamp of when the file extent was stored in the RAM device.

21. The data processing system of claim 15, wherein the determined plurality of characteristics includes information identifying a timestamp when a file extent was accessed from the RAM device, information identifying whether a file extent was sequentially or randomly accessed, and information identifying a frequency of access of a file extent from the RAM device.

* * * * *